United States Patent
Lee et al.

(10) Patent No.: US 11,728,513 B2
(45) Date of Patent: Aug. 15, 2023

(54) ELECROLYTE ADDITIVE FOR LITHIUM SECONDARY BATTERY, ELECTROLYTE FOR LITHIUM SECONDARY BATTERY, AND LITHIUM SECONDARY BATTERY INCLUDING ELECTROLYTE

(71) Applicant: SAMSUNG SDI CO., LTD., Yongin-si (KR)

(72) Inventors: Harim Lee, Yongin-si (KR); Younghye Kang, Yongin-si (KR); Aeran Kim, Yongin-si (KR); Hyejin Park, Yongin-si (KR); Myungheui Woo, Yongin-si (KR); Duckjae You, Yongin-si (KR); Taejin Lee, Yongin-si (KR); Jinhyeok Lim, Yongin-si (KR); Wonseok Cho, Yongin-si (KR); Olga Tsay, Yongin-si (KR); Hyunbong Choi, Yongin-si (KR); Pavel Shatunov, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 467 days.

(21) Appl. No.: 16/857,307

(22) Filed: Apr. 24, 2020

(65) Prior Publication Data

US 2020/0343589 A1    Oct. 29, 2020

(30) Foreign Application Priority Data

Apr. 26, 2019  (KR) .................. 10-2019-0049300

(51) Int. Cl.
*H01M 10/0567* (2010.01)
*H01M 10/0525* (2010.01)
(Continued)

(52) U.S. Cl.
CPC ........... *H01M 10/0567* (2013.01); *C07F 7/10* (2013.01); *H01M 4/364* (2013.01); *H01M 4/386* (2013.01);
(Continued)

(58) Field of Classification Search
CPC .. H01M 10/0567; H01M 4/364; H01M 4/386; H01M 4/505; H01M 4/525;
(Continued)

(56) References Cited

U.S. PATENT DOCUMENTS 9,640,839 B2    5/2017  Porta Garcia et al.
2009/0035656 A1  2/2009  Lee et al.
(Continued)

FOREIGN PATENT DOCUMENTS

KR    10-2008-0095352 A    10/2008
KR    10-2015-0011234 A    1/2015
(Continued)

OTHER PUBLICATIONS

Korean Notice of Allowance dated Feb. 27, 2022.

*Primary Examiner* — Miriam Stagg
*Assistant Examiner* — Rachel L Zhang
(74) *Attorney, Agent, or Firm* — Lee IP Law, P.C.

(57) ABSTRACT

An electrolyte additive for a lithium secondary battery, an electrolyte, and a lithium secondary battery, the additive comprising a compound represented by Formula 1 below:

(Continued)

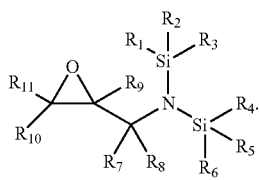

<Formula 1>

15 Claims, 1 Drawing Sheet

(51) Int. Cl.
  *H01M 10/0568* (2010.01)
  *H01M 10/0569* (2010.01)
  *H01M 4/525* (2010.01)
  *H01M 4/587* (2010.01)
  *H01M 4/505* (2010.01)
  *C07F 7/10* (2006.01)
  *H01M 4/36* (2006.01)
  *H01M 4/38* (2006.01)

(52) U.S. Cl.
  CPC ........... *H01M 4/505* (2013.01); *H01M 4/525* (2013.01); *H01M 4/587* (2013.01); *H01M 10/0525* (2013.01); *H01M 10/0568* (2013.01); *H01M 10/0569* (2013.01); *H01M 2300/004* (2013.01)

(58) Field of Classification Search
  CPC ............. H01M 4/587; H01M 10/0525; H01M 10/0568; H01M 10/0569; H01M 2300/004; C07F 7/10
  See application file for complete search history.

(56) References Cited

U.S. PATENT DOCUMENTS

| | | | |
|---|---|---|---|
| 2010/0311899 A1* | 12/2010 | Luo | C08F 8/30 524/588 |
| 2013/0302668 A1 | 11/2013 | Lim et al. | |
| 2015/0024282 A1 | 1/2015 | Lee et al. | |
| 2015/0079483 A1 | 3/2015 | Cresce et al. | |
| 2015/0207174 A1 | 7/2015 | Lee et al. | |
| 2019/0288337 A1 | 9/2019 | Choi et al. | |
| 2020/0203766 A1 | 6/2020 | Park et al. | |

FOREIGN PATENT DOCUMENTS

| | | |
|---|---|---|
| KR | 10-2015-0070069 A | 6/2015 |
| KR | 10-2015-0087457 A | 7/2015 |
| KR | 10-2016-0033718 A | 3/2016 |
| KR | 10-2019-0018866 A | 2/2019 |
| KR | 10-2019-0109099 A | 9/2019 |

* cited by examiner

ELECROLYTE ADDITIVE FOR LITHIUM SECONDARY BATTERY, ELECTROLYTE FOR LITHIUM SECONDARY BATTERY, AND LITHIUM SECONDARY BATTERY INCLUDING ELECTROLYTE

CROSS-REFERENCE TO RELATED APPLICATION

Korean Patent Application No. 10-2019-049300, filed on Apr. 26, 2019, in the Korean Intellectual Property Office, and entitled: "Additive of Electrolyte for Lithium Secondary Battery, Electrolyte for Lithium Secondary Battery, and Lithium Secondary Battery Including Electrolyte," is incorporated by reference herein in its entirety.

BACKGROUND

1. Field

Embodiments relate to an electrolyte additive for a lithium secondary battery, an electrolyte for a lithium secondary battery, and a lithium secondary battery including the electrolyte.

2. Description of Related Art

Lithium batteries may be used as power sources for driving portable electronic appliances such as video cameras, mobile phones, and notebook computers. Rechargeable lithium secondary batteries have three times higher energy density per unit weight than conventional lead batteries, nickel-cadmium batteries, nickel metal hydride batteries, and nickel-zinc batteries, and may be charged at high speed.

Lithium secondary batteries may be operated at a high driving voltage, and aqueous electrolytes having high reactivity with lithium may not be used. As the electrolyte for lithium secondary batteries, an organic electrolyte may be used. The organic electrolyte may be prepared by dissolving a lithium salt in an organic solvent. The organic solvent may be stable at a high voltage, may have high ionic conductivity and a high dielectric constant, and may have low viscosity.

SUMMARY

The embodiments may be realized by providing an electrolyte additive for a lithium secondary battery, the additive including a compound represented by Formula 1 below:

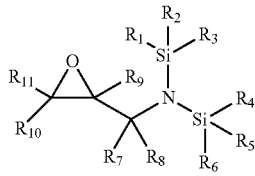

<Formula 1> wherein, in Formula 1, $R_1$ to $R_6$ are each independently a substituted or unsubstituted $C_1$-$C_{30}$ alkyl group, a substituted or unsubstituted $C_1$-$C_{30}$ alkoxyalkyl group, a substituted or unsubstituted $C_4$-$C_{30}$ carbocyclic group, a substituted or unsubstituted $C_6$-$C_{30}$ aryl group, a substituted or unsubstituted $C_2$-$C_{30}$ alkenyl group, a substituted or unsubstituted $C_2$-$C_{30}$ alkynyl group, or a substituted or unsubstituted $C_2$-$C_{30}$ heteroaryl group; $R_7$ and $R_8$ are each independently hydrogen, a substituted or unsubstituted $C_1$-$C_{30}$ alkyl group, a substituted or unsubstituted $C_1$-$C_{30}$ alkoxyalkyl group, a substituted or unsubstituted $C_4$-$C_{30}$ carbocyclic group, a substituted or unsubstituted $C_6$-$C_{30}$ aryl group, a substituted or unsubstituted $C_2$-$C_{30}$ alkenyl group, a substituted or unsubstituted $C_2$-$C_{30}$ alkynyl group, or a substituted or unsubstituted $C_2$-$C_{30}$ heteroaryl group; and $R_9$ to $R_{11}$ are each independently hydrogen, fluorine, a substituted or unsubstituted $C_1$-$C_{30}$ alkyl group, a substituted or unsubstituted $C_1$-$C_{30}$ alkoxyalkyl group, a substituted or unsubstituted $C_4$-$C_{30}$ carbocyclic group, a substituted or unsubstituted $C_6$-$C_{30}$ aryl group, a substituted or unsubstituted $C_2$-$C_{30}$ alkenyl group, a substituted or unsubstituted $C_2$-$C_{30}$ alkynyl group, or a substituted or unsubstituted $C_2$-$C_{30}$ heteroaryl group.

In Formula 1, $R_1$ to $R_6$ may each independently be an unsubstituted $C_1$-$C_{30}$ alkyl group; an unsubstituted $C_1$-$C_{30}$ alkoxyalkyl group; a $C_1$-$C_{30}$ alkyl group substituted with at least one selected from a methyl group, an ethyl group, a propyl group, a butyl group, —F, —Cl, —Br, —I, a cyano group, a hydroxy group, and a nitro group; a $C_2$-$C_{30}$ alkenyl group substituted with at least one selected from a methyl group, an ethyl group, a propyl group, a butyl group, —F, —Cl, —Br, —I, a cyano group, a hydroxy group, and a nitro group; a $C_1$-$C_{30}$ alkoxyalkyl group substituted with at least one selected from a methyl group, an ethyl group, a propyl group, a butyl group, —F, —Cl, —Br, —I, a cyano group, a hydroxy group, and a nitro group; a $C_2$-$C_{30}$ alkenyl group substituted with at least one selected from a methyl group, an ethyl group, a propyl group, a butyl group, —F, —Cl, —Br, —I, a cyano group, a hydroxy group, and a nitro group; or a $C_2$-$C_{30}$ alkynyl group substituted with at least one selected from a methyl group, an ethyl group, a propyl group, a butyl group, —F, —Cl, —Br, —I, a cyano group, a hydroxy group, and a nitro group.

In Formula 1, $R_7$ and $R_8$ may each independently be hydrogen or a substituted or unsubstituted $C_1$-$C_{10}$ alkyl group, and $R_9$ to $R_{11}$ may each independently be hydrogen, fluorine, or a substituted or unsubstituted $C_1$-$C_{10}$ alkyl group.

The compound represented by Formula 1 may be a compound represented by Formula 2:

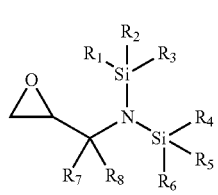

<Formula 2> wherein, in Formula 2, $R_1$ to $R_6$ may each independently be a substituted or unsubstituted $C_1$-$C_{30}$ alkyl group, a substituted or unsubstituted $C_1$-$C_{30}$ alkoxyalkyl group, a substituted or unsubstituted $C_4$-$C_{30}$ carbocyclic group, a substituted or unsubstituted $C_6$-$C_{30}$ aryl group, a substituted or unsubstituted $C_2$-$C_3$ alkenyl group, a substituted or unsubstituted $C_2$-$C_{30}$ alkynyl group, or, a substituted or unsubstituted $C_2$-$C_{30}$ heteroaryl group; and $R_7$ and $R_8$ may each independently be hydrogen, a substituted or unsubstituted $C_1$-$C_{30}$ alkyl group, a substituted or unsubstituted $C_1$-$C_{30}$ alkoxyalkyl group, a substituted or unsubstituted $C_4$-$C_{30}$ carbocyclic group, a substituted or unsubstituted $C_6$-$C_{30}$ aryl group, a substituted or unsubstituted $C_2$-$C_{30}$ alkenyl group, a substituted or unsubstituted $C_2$-$C_{30}$ alkynyl group, or a substituted or unsubstituted $C_2$-$C_3$ heteroaryl group.

The compound represented by Formula 1 may be a compound represented by Formula 3:

<Formula 3> wherein, in Formula 3, $R_1$ to $R_6$ may each independently be a substituted or unsubstituted $C_1$-$C_{30}$ alkyl group, a substituted or unsubstituted $C_1$-$C_{30}$ alkoxyalkyl group, a substituted or unsubstituted $C_4$-$C_{30}$ carbocyclic group, a substituted or unsubstituted $C_6$-$C_{30}$ aryl group, a substituted or unsubstituted $C_2$-$C_{30}$ alkenyl group, a substituted or unsubstituted $C_2$-$C_{30}$ alkynyl group, or, a substituted or unsubstituted $C_2$-$C_{30}$ heteroaryl group; and a substituent of the substituted $C_1$-$C_{30}$ alkyl group, the substituted $C_1$-$C_{30}$ alkoxyalkyl group, the substituted $C_4$-$C_{30}$ carbocyclic group, the substituted $C_6$-$C_{30}$ aryl group, the substituted $C_2$-$C_{30}$ alkenyl group, the substituted $C_2$-$C_{30}$ alkynyl group, or the substituted $C_2$-$C_{30}$ heteroaryl group may include at least one selected from a $C_1$-$C_{20}$ alkyl group, a $C_2$-$C_{20}$ alkenyl group, a $C_2$-$C_{20}$ alkynyl group, a $C_1$-$C_{20}$ alkoxy group, halogen, a cyano group, a hydroxy group, and a nitro group.

The compound represented by Formula 1 may be a compound represented by one of Formulae 4 to 8:

<Formula 4>

<Formula 5>

<Formula 6>

<Formula 7>

<Formula 8>

The embodiments may be realized by providing an electrolyte for a lithium secondary battery, the electrolyte including a lithium salt; a non-aqueous organic solvent; and the additive according to an embodiment.

The additive may be included in the electrolyte in an amount of about 0.1 wt % to about 10 wt %, based on a total weight of the electrolyte.

The additive may be included in the electrolyte in an amount of about 0.1 wt % to about 5 wt %, based on a total weight of the electrolyte.

The lithium salt may include $LiPF_6$, $LiBF_4$, $LiCF_3SO_3$, $Li(CF_3SO_2)_2N$, $LiC_2F_5SO_3$, $Li(FSO_2)_2N$, $LiC_4F_9SO_3$, $LiN(SO_2CF_2CF_3)_2$, or a compound represented by one of Formulae 11 to 14:

<Formula 11>

<Formula 12>

<Formula 13>

<Formula 14>

The non-aqueous organic solvent may include ethyl methyl carbonate (EMC), methyl propyl carbonate, ethyl propyl carbonate, dimethyl carbonate (DMC), diethyl carbonate (DEC), dipropyl carbonate, propylene carbonate (PC), ethylene carbonate (EC), fluoroethylene carbonate (FEC), Vinylene carbonate (VC), vinylethylene carbonate (VEC), butylene carbonate, ethylpropionate, ethylbutyrate, dimethylsulfoxide, dimethylformamide, dimethylacetamide, gamma-valerolactone, gamma-butyrolactone, or tetrahydrofuran.

The embodiments may be realized by providing a lithium secondary battery including a cathode including a cathode active material; an anode including an anode active material; and an electrolyte between the cathode and the anode, wherein the electrolyte includes the additive according to an embodiment.

The cathode active material may include a lithium transition metal oxide containing nickel and at least one transition metal, and the content of the nickel may be 80 mol % or more, based on a total mole number of the transition metal.

The lithium transition metal oxide may be represented by Formula 16:

  <Formula 16> wherein, in Formula 16, 1.0≤a≤1.2, 0≤b≤0.2, 0.6≤x<1, 0<y≤0.3, 0<z≤0.3, and x+y+z=1 may be satisfied; M may be manganese (Mn), vanadium (V), magnesium (Mg), gallium (Ga), silicon (Si), tungsten (W), molybdenum (Mo), iron (Fe), chromium (Cr), copper (Cu), zinc (Zn), titanium (Ti), aluminum (Al), or boron (B); and A may be F, S, Cl, Br, or a combination thereof.

The lithium transition metal oxide may be represented by Formula 17 or 18:

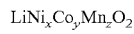  <Formula 17> wherein, in Formula 17, 0.6≤x≤0.95, 0<y≤0.2, 0<z≤0.1, and x+y+z=1 may be satisfied,

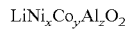  <Formula 18> wherein, in Formula 18, 0.6≤x≤0.95, 0<y≤0.2, 0<z≤0.1, and x+y+z=1 may be satisfied.

The anode active material may include a silicon compound, a carbon compound, or a composite of the silicon compound and the carbon compound.

BRIEF DESCRIPTION OF THE DRAWING

Features will be apparent to those of skill in the art by describing in detail exemplary embodiments with reference to the attached drawing in which.

DETAILED DESCRIPTION

Figure 1:
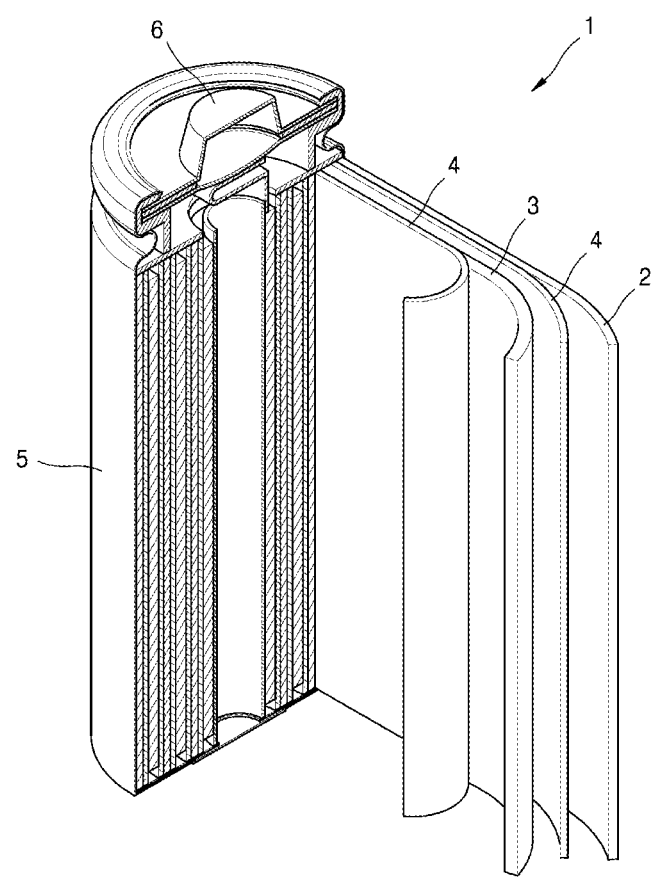
FIG. 1 illustrates a schematic view of a lithium secondary battery according to an embodiment.

Example embodiments will now be described more fully hereinafter with reference to the accompanying drawing; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing FIGURE, the dimensions of layers and regions may be exaggerated for clarity of illustration. It will also be understood that when a layer or element is referred to as being "on" another layer or element, it can be directly on the other layer or element, or intervening layers or elements may also be present. In addition, it will also be understood that when a layer is referred to as being "between" two layers, it can be the only layer between the two layers, or one or more intervening layers may also be present. Like reference numerals refer to like elements throughout.

As used herein, the terms "or" and "and/or" are not exclusive terms, and include any and all combinations of one or more of the associated listed items. Throughout the disclosure, the expression "at least one of a, b or c" and the like indicate only a, only b, only c, both a and b, both a and c, both b and c, all of a, b, and c, or variations thereof.

Hereinafter, an electrolyte additive for a lithium secondary battery, an electrolyte including the additive, and a lithium secondary battery employing the electrolyte will be described in more detail.

An additive for an electrolyte for a lithium secondary battery may include a compound represented by Formula 1 below.

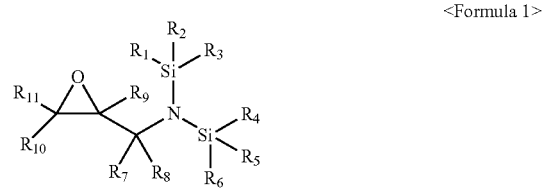

<Formula 1>

In Formula 1, $R_1$ to $R_6$ may each independently be, e.g., a substituted or unsubstituted $C_1$-$C_{30}$ alkyl group, a substituted or unsubstituted $C_1$-$C_{30}$ alkoxyalkyl group, a substituted or unsubstituted $C_4$-$C_{30}$ carbocyclic group, a substituted or unsubstituted $C_6$-$C_{30}$ aryl group, a substituted or unsubstituted $C_2$-$C_{30}$ alkenyl group, a substituted or unsubstituted $C_2$-$C_{30}$ alkynyl group, or a substituted or unsubstituted $C_2$-$C_{30}$ heteroaryl group;

$R_7$ and $R_8$ may each independently be, e.g., hydrogen, a substituted or unsubstituted $C_1$-$C_3$ alkyl group, a substituted or unsubstituted $C_1$-$C_{30}$ alkoxyalkyl group, a substituted or unsubstituted $C_4$-$C_{30}$ carbocyclic group, a substituted or unsubstituted $C_6$-$C_{30}$ aryl group, a substituted or unsubstituted $C_{2-30}$ alkenyl group, a substituted or unsubstituted $C_2$-$C_{30}$ alkynyl group, or a substituted or unsubstituted $C_2$-$C_{30}$ heteroaryl group; and $R_9$ to $R_{11}$ may each independently be, e.g., hydrogen, fluorine, a substituted or unsubstituted $C_1$-$C_{30}$ alkyl group, a substituted or unsubstituted $C_1$-$C_{30}$ alkoxyalkyl group, a substituted or unsubstituted $C_4$-$C_{30}$ carbocyclic group, a substituted or unsubstituted $C_6$-$C_{30}$ aryl group, a substituted or unsubstituted $C_2$-$C_{30}$ alkenyl group, a substituted or unsubstituted $C_2$-$C_{30}$ alkynyl group, or a substituted or unsubstituted $C_2$-$C_{30}$ heteroaryl group.

In an implementation, in Formula 1, $R_1$ to $R_6$ may each independently be, e.g., an unsubstituted $C_1$-$C_{30}$ alkyl group; an unsubstituted $C_1$-$C_{30}$ alkoxyalkyl group; a $C_1$-$C_{30}$ alkyl group substituted with at least one selected from a methyl group, an ethyl group, a propyl group, a butyl group, —F, —Cl, —Br, —I, a cyano group, a hydroxy group, and a nitro group; a $C_2$-$C_{30}$ alkenyl group substituted with at least one selected from a methyl group, an ethyl group, a propyl group, a butyl group, —F, —Cl, —Br, —I, a cyano group, a hydroxy group, and a nitro group; a $C_2$-$C_{30}$ alkynyl group substituted with at least one selected from a methyl group, an ethyl group, a propyl group, a butyl group, —F, —Cl, —Br, —I, a cyano group, a hydroxy group, and a nitro group; or a $C_1$-$C_{30}$ alkoxyalkyl group substituted with at least one selected from a methyl group, an ethyl group, a propyl group, a butyl group, —F, —Cl, —Br, —I, a cyano group, a hydroxy group, and a nitro group.

In an implementation, in Formula 1, $R_7$ and $R_8$ may each independently be, e.g., hydrogen or a substituted or unsubstituted $C_1$-$C_{10}$ alkyl group. In an implementation, in Formula 1, $R_7$ and $R_8$ may each independently be, e.g., a substituted or unsubstituted $C_1$-$C_5$ alkyl group. In an implementation, $R_9$ to $R_{11}$ may each independently be, e.g., hydrogen, fluorine (F), or a substituted or unsubstituted $C_1$-$C_{10}$ alkyl group.

A lithium transition metal oxide containing nickel and at least one transition metal, and having a nickel content of 80 mol % or more, based on a total mole number of the transition metal, may be used as a cathode active material, thereby manufacturing a lithium secondary battery having high output and high capacity. In a lithium secondary battery, the lithium transition metal oxide having a high lithium content may have an unstable surface structure, the generation of gas by a side reaction could increase during the charge-discharge process of the battery, and the elution of a transition metal such as nickel could be further enhanced. Lifetime characteristics of the lithium secondary battery could be deteriorated. Further, resistance of the lithium secondary battery could increase at high temperature, and it may be desirable that the stability of the lithium secondary battery at high temperature be improved.

When using the additive including the compound of Formula 1, an increase in initial resistance may be effectively suppressed and output characteristics may be improved, and an effect of suppressing resistance at high temperature may be excellent, thereby manufacturing a lithium secondary battery having improved lifetime characteristics and stability at high temperature.

In an implementation, the compound represented by Formula 1 may be a compound represented by Formula 2.

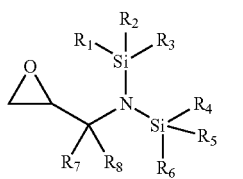

<Formula 2>

In Formula 2, $R_1$ to $R_6$ may each independently be, e.g., a substituted or unsubstituted $C_1$-$C_{30}$ alkyl group, a substituted or unsubstituted $C_1$-$C_{30}$ alkoxyalkyl group, a substituted or unsubstituted $C_4$-$C_{30}$ carbocyclic group, a substituted or unsubstituted $C_6$-$C_{30}$ aryl group, a substituted or unsubstituted $C_2$-$C_{30}$ alkenyl group, a substituted or unsubstituted $C_2$-$C_{30}$ alkynyl group, or, a substituted or unsubstituted $C_2$-$C_{30}$ heteroaryl group. $R_7$ and $R_8$ may each independently be, e.g., hydrogen, a substituted or unsubstituted $C_1$-$C_{30}$ alkyl group, a substituted or unsubstituted $C_1$-$C_{30}$ alkoxyalkyl group, a substituted or unsubstituted $C_4$-$C_{30}$ carbocyclic group, a substituted or unsubstituted $C_6$-$C_{30}$ aryl group, a substituted or unsubstituted $C_2$-$C_{30}$ alkenyl group, a substituted or unsubstituted $C_2$-$C_{30}$ alkynyl group, or a substituted or unsubstituted $C_2$-$C_{30}$ heteroaryl group. In an implementation, in Formula 2, $R_1$ to $R_6$ may each independently be, e.g., an unsubstituted $C_1$-$C_{30}$ alkyl group; an unsubstituted $C_1$-$C_{30}$ alkoxyalkyl group; a $C_1$-$C_{30}$ alkyl group substituted with at least one selected from a methyl group, an ethyl group, a propyl group, a butyl group, —F, —Cl, —Br, —I, a cyano group, a hydroxy group, and a nitro group; a $C_2$-$C_{30}$ alkenyl group substituted with at least one selected from a methyl group, an ethyl group, a propyl group, a butyl group, —F, —Cl, —Br, —I, a cyano group, a hydroxy group, and a nitro group; a $C_2$-$C_{30}$ alkynyl group substituted with at least one selected from a methyl group, an ethyl group, a propyl group, a butyl group, —F, —Cl, —Br, —I, a cyano group, a hydroxy group, and a nitro group; or a $C_1$-$C_{30}$ alkoxyalkyl group substituted with at least one selected from a methyl group, an ethyl group, a propyl group, a butyl group, —F, —Cl, —Br, —I, a cyano group, a hydroxy group, and a nitro group.

In an implementation, in Formula 2, $R_7$ and $R_8$ may each independently be, e.g., hydrogen or a substituted or unsubstituted $C_1$-$C_{10}$ alkyl group. In an implementation, in Formula 2, $R_7$ and $R_8$ may each independently be, e.g., a substituted or unsubstituted $C_1$-$C_5$ alkyl group.

In an implementation, the compound represented by Formula 1 may be a compound represented by Formula 3.

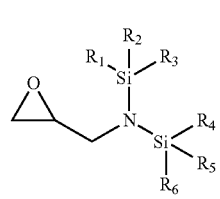

<Formula 3>

In Formula 3, $R_1$ to $R_6$ may each independently be, e.g., a substituted or unsubstituted $C_1$-$C_{30}$ alkyl group, a substituted or unsubstituted $C_1$-$C_{30}$ alkoxyalkyl group, a substituted or unsubstituted $C_4$-$C_{30}$ carbocyclic group, a substituted or unsubstituted $C_6$-$C_{30}$ aryl group, a substituted or unsubstituted $C_2$-$C_{30}$ alkenyl group, a substituted or unsubstituted $C_2$-$C_{30}$ alkynyl group, or, a substituted or unsubstituted $C_2$-$C_{30}$ heteroaryl group.

In an implementation, a substituent of the substituted $C_1$-$C_{30}$ alkyl group, the substituted $C_1$-$C_{30}$ alkoxyalkyl group, the substituted $C_4$-$C_{30}$ carbocyclic group, the substituted $C_6$-$C_{30}$ aryl group, the substituted $C_2$-$C_{30}$ alkenyl group, the substituted $C_2$-$C_{30}$ alkynyl group, or the substituted $C_2$-$C_{30}$ heteroaryl group may include, e.g., a $C_1$-$C_{20}$ alkyl group, a $C_2$-$C_{20}$ alkenyl group, a $C_2$-$C_{20}$ alkynyl group, a $C_1$-$C_{20}$ alkoxy group, halogen, a cyano group, a hydroxy group, or a nitro group.

In an implementation, in Formula 3, $R_1$ to $R_6$ may each independently be, e.g., a substituted or unsubstituted $C_1$-$C_{10}$ alkyl group, a substituted or unsubstituted $C_1$-$C_{10}$ alkoxy group, a substituted or unsubstituted $C_2$-$C_{10}$ alkenyl group, a substituted or unsubstituted $C_2$-$C_{10}$ alkynyl group, or a substituted or unsubstituted $C_1$-$C_{10}$ alkoxyalkyl group.

The $C_1$-$C_{10}$ alkyl group may be, e.g., a methyl group, a butyl group, an ethyl group, or a propyl group, and the $C_1$-$C_{10}$ alkoxy group may be, e.g., a methoxy group, an ethoxy group, a propoxy group, a butoxy group, or a pentyloxy group. The $C_2$-$C_{10}$ alkenyl group may be, e.g., a vinyl group, and the $C_2$-$C_{10}$ alkynyl group may be, e.g., an ethynyl, a propynyl, a butyl, or a 3,3-dimethylbutynyl. The $C_1$-$C_{10}$ alkoxyalkyl group is may be, e.g., an ethoxymethyl group, a methoxymethyl group, an ethoxybutyl group, a methoxybutyl group, a methoxyethyl group, or an ethoxyethyl group.

Without being bound by theory, the compound may be added to an electrolyte to improve the performance of a lithium secondary battery, as described in more detail below.

As a lithium salt included in an electrolyte, $LiPF_6$ may be used. $LiPF_6$ may have insufficient thermal stability and may be easily hydrolyzed even by water. When an additive containing the compound represented by Formula 1 is added to an electrolyte, nitrogen in the compound of Formula 1 may capture water ($H_2O$) molecules and $PF_5^-$ ions generated by the decomposition of $LiPF_6$, thereby suppressing the hydrolysis reaction of $LiPF_6$ by water. As a result, the generation of gas in the lithium secondary battery may be suppressed, and thus, the cycle lifetime characteristics of the lithium secondary battery may be improved. Further, the swelling phenomenon of the battery may be prevented due to the suppression of gas generation.

The compound represented by Formula 1 may include nitrogen, the decomposition of an organic solvent such as ethylene carbonate (EC) may be suppressed to reduce gas generation, and, as a result, a resistance increase rate may be lowered.

During the initial charging of the lithium secondary battery, the decomposition reaction of the electrolyte may occur on the surface of an anode. This is because the reduction potential of the electrolyte may be relatively high as compared to that of lithium. Such an electrolyte decomposition reaction may cause a solid electrolyte interphase (SEI) to be formed on the surface of an electrode to inhibit the movement of electrons required for the reaction between the anode and the electrolyte, thereby preventing further decomposition of the electrolyte. The performance of the battery may depend on the characteristics of the film formed on the surface of the anode. Considering this phenomenon, the formation of an SEI film having more robust and excellent electrical properties may be achieved through the introduction of an electrolyte additive that may decompose prior to the electrolyte during the charging reaction The electrolyte additive for a lithium secondary battery, represented by Formula 1, may include a silyl group —Si($R_4$)($R_5$)($R_6$) at the end thereof, and the additive may be decomposed prior to the electrolyte to form an SEI film having more robust and excellent electrical characteristics on the surface of the anode. When the SEI film having more robust and excellent electrical characteristics is formed on the surface of the anode, the decomposition of the surface of the anode that could otherwise occur during high temperature cycle operation may be prevented, and the oxidation reaction of the electrolyte may be prevented. The SEI film having a high concentration of the silyl group may be formed to form a chemically stable high polar film. The lithium ionic conductivity may be improved by lowering the resistance at the interface between the electrolyte and the anode, thereby causing a low-temperature discharge voltage rising effect.

In an implementation, the compound represented by Formula 1 may be a compound represented by one of the following Formulae 4 to 8. In the following formulae, $CH_3$ represents a methyl group, $C_4H_9$ represents a butyl group, and $C_6H_5$ represents a phenyl group.

<Formula 4>

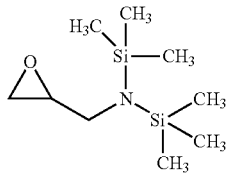

<Formula 5>

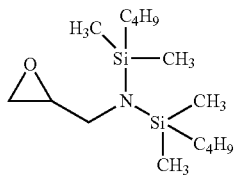

<Formula 6>

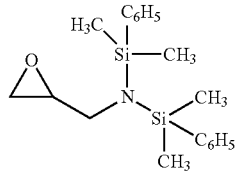

<Formula 7>

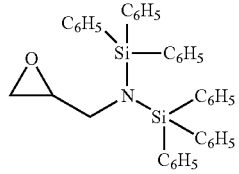

<Formula 8>

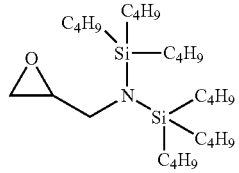

The electrolyte for a lithium secondary battery according to an embodiment may include, e.g., a lithium salt; an non-aqueous organic solvent; and the additive.

In an implementation, the additive may be included in the electrolyte in an amount of, e.g., about 0.1 wt % to about 10 wt %, based on the total weight of the electrolyte for a lithium secondary battery. In an implementation, the amount of the additive may be a suitable amount that does not inhibit battery characteristics. In an implementation, the additive may be included in the electrolyte in an amount of, e.g., about 0.1 wt % to about 5 wt %, about 0.5 wt % about 5 wt %, about 1 wt % to about 5 wt %, or about 3 wt % to about 5 wt %. When the content of the additive is within the above ranges, a lithium secondary battery have improved high-temperature characteristics and resistance characteristics without deteriorating the lifetime of the battery.

In an implementation, the lithium salt may include a suitable lithium salt, e.g., $LiPF_6$, $LiBF_4$, $LiCF_3SO_3$, $Li(CF_3SO_2)_2N$, $LiC_2F_5SO_3$, $Li(FSO_2)_2N$, $LiC_4F_9SO_3$, $LiN(SO_2CF_2CF_3)_2$, or a compound represented by one of Formulae 11 to 14.

<Formula 11>

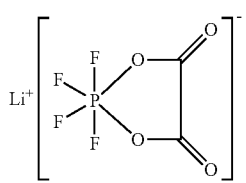

<Formula 12>

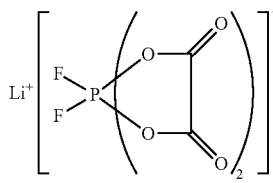

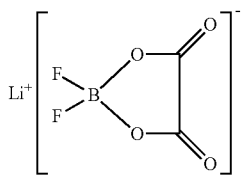
<Formula 13>

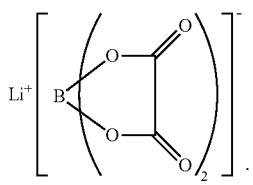
<Formula 14>

The concentration of the lithium salt in the electrolyte may be about 0.01 M to about 5.0 M, e.g., about 0.05 M to about 5.0 M, about 0.1 M to about 5.0 M, or about 0.1 M to about 2.0 M. When the concentration of the lithium salt is within the above ranges, since the electrolyte has an appropriate conductivity and viscosity, the electrolyte may exhibit excellent electrolyte performance, and lithium ions may move effectively. As a result, further improved lithium secondary battery characteristics may be obtained.

The non-aqueous organic solvent may include, e.g., a carbonate solvent, an ester solvent, an ether solvent, or a ketone solvent.

In an implementation, as the carbonate solvent, ethyl methyl carbonate (EMC), methyl propyl carbonate (MPC), ethyl propyl carbonate (EPC), dimethyl carbonate (DMC), diethyl carbonate (DEC), dipropyl carbonate (DPC), propylene carbonate (PC), ethylene carbonate (EC), or butylene carbonate (BC) may be used. In an implementation, as the ester solvent, methyl propionate, ethyl propionate, ethyl butyrate, methyl acetate, ethyl acetate, n-propyl acetate, dimethyl acetate, gamma butyrolactone, decanolide, gamma valerolactone, mevalonolactone, or caprolactone may be used. As the ether solvent, dibutyl ether, tetraglyme, diglyme, dimethoxyethane, 2-methyltetrahydrofuran, or tetrahydrofuran may be used. In an implementation, as the ketone solvent, cyclohexanone may be used. In an implementation, as the nitrile solvent, acetonitrile (AN), succinonitrile (SN), or adiponitrile may be used. In an implementation, as other solvents, dimethyl sulfoxide, dimethylformamide, dimethylacetamide, and tetrahydrofuran may be used. In an implementation, another suitable solvent may be used. In an implementation, the non-aqueous organic solvent may be, e.g., a mixed solvent of 50 vol % to 95 vol % of chained carbonate and 5 vol % to 50 vol % of cyclic carbonate, or a mixed solvent of 70 vol % to 95 vol % of chained carbonate and 5 vol % to 30 vol % of cyclic carbonate. For example, the non-aqueous organic solvent may be a mixed solvent of three or more non-aqueous organic solvents.

In an implementation, the non-aqueous organic solvent may include, e.g., ethyl methyl carbonate (EMC), methyl propyl carbonate, ethyl propyl carbonate, dimethyl carbonate (DMC), diethyl carbonate (DEC), dipropyl carbonate, propylene carbonate (PC), ethylene carbonate (EC), fluoroethylene carbonate (FEC), vinylene carbonate (VC), vinylethylene carbonate (VEC), butylene carbonate, ethylpropionate, ethylbutyrate, dimethylsulfoxide, dimethylformamide, dimethylacetamide, gamma-valerolactone, gamma-butyrolactone, or tetrahydrofuran.

In an implementation, the electrolyte for a lithium secondary battery may further include, e.g., an aliphatic nitrile compound. In an implementation, the aliphatic nitrile compound may include acetonitrile (AN), succinonitrile (SN), or another suitable aliphatic nitrile compound that includes a nitrile group at the end of hydrocarbon.

In an implementation, the aliphatic nitrile compound may be included in an amount of about 0.1 wt % to about 10 wt %. In an implementation, the amount of the aliphatic nitrile may be appropriately selected within the range in which a metal elution inhibiting effect is not inhibited.

In an implementation, the electrolyte for a lithium secondary battery may further include an aromatic hydrocarbon solvent. In an implementation, as the aromatic hydrocarbon solvent, an aromatic hydrocarbon compound of Formula 15 may be used.

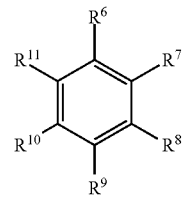
<Formula 15>

In Formula 15, $R^6$ to $R^{11}$ may each independently be, e.g., hydrogen, halogen, an alkyl group of 1 to 10 carbon atoms, a haloalkyl group, and combinations thereof.

Examples of the aromatic hydrocarbon solvent may include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-dioodobenzene, 1,3-dioodobenzene, 1,4-dioodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diodotoluene, 2,4-diodotoluene, 2,5-diaodotoluene, 2,3,4-triiodotoluene, 2,3,5-triiodotoluene, xylene, and combinations thereof.

The electrolyte may be in a liquid or gel state.

A lithium secondary battery according to another embodiment may include, e.g., a cathode including a cathode active material; an anode including an anode active material; and an electrolyte between the cathode and the anode (e.g., impregnating the electrode assembly of the battery), wherein the electrolyte includes the aforementioned additive.

The lithium secondary battery may include the aforementioned additive, an initial resistance increase of the lithium secondary battery may be suppressed, the generation of gas by a side reaction may be suppressed, and lifetime characteristics may be improved. The cathode active material may include a lithium transition metal oxide containing nickel and another transition metal. In an implementation, the nickel content of the lithium transition metal oxide containing nickel and another transition metal may be, e.g., 60 mol % or more, 75 mol % or more, 80 mol % or more, 85 mol % or more, or 90 mol % or more, based on the total mole number of transition metals.

In an implementation, the lithium transition metal oxide may be represented by Formula 16.

$$Li_aNi_xCo_yM_zO_{2-b}A_b \qquad \text{<Formula 16>}$$

In Formula 16, $1.0 \le a \le 1.2$, $0 \le b \le 0.2$, $0.6 \le x<1$, $0<y \le 0.3$, $0<z \le 0.3$, and $x+y+z=1$ may be satisfied; M may be, e.g., manganese (Mn), vanadium (V), magnesium (Mg), gallium (Ga), silicon (Si), tungsten (W), molybdenum (Mo), iron (Fe), chromium (Cr), copper (Cu), zinc (Zn), titanium (Ti), aluminum (Al), or boron (B); and A may be, e.g., F, S, Cl, Br, or a combination thereof. For example, $0.7 \le x<1$, $0<y \le 0.3$, $0<z \le 0.3$; $0.8 \le x<1$, $0<y \le 0.3$, $0<z \le 0.3$; $0.8 \le x<1$, $0<y \le 0.2$, $0<z \le 0.2$; $0.83 \le x<0.97$, $0<y \le 0.15$, $0<z \le 0.15$; or $0.85 \le x<0.95$, $0<y \le 0.1$, $0<z \le 0.1$ may be satisfied.

In an implementation, the lithium transition metal oxide may be a compound represented by one of Formulae 17 and 18.

$$LiNi_xCo_yMn_zO_2 \qquad \text{<Formula 17>}$$

In Formula 17, $0.6 \le x \le 0.95$, $0<y \le 0.3$, and $0<z \le 0.3$, and $x+y+z=1$ may be satisfied.

$$LiNi_xCo_yAl_zO_2 \qquad \text{<Formula 18>}$$

In Formula 18, $0.6 \le x \le 0.95$, $0<y \le 0.3$, and $0<z \le 0.3$, and $x+y+z=1$ may be satisfied.

In Formulas 17 and 18, for example, $0.7 \le x \le 0.95$, $0.8 \le x \le 0.95$, $0.82 \le x \le 0.95$, or $0.85 \le x \le 0.95$ may be satisfied. For example, $0<y \le 0.2$, $0<y \le 0.15$, or $0<y \le 0.1$ may be satisfied. For example, $0<z \le 0.2$, $0<z \le 0.15$, or $0<z \le 0.1$ may be satisfied In an implementation, the lithium transition metal oxide may be, e.g., $LiNi_{0.7}Co_{0.2}Mn_{0.1}O_2$, $LiNi_{0.88}Co_{0.08}Mn_{0.04}O_2$, $LiNi_{0.8}Co_{0.15}Mn_{0.05}O_2$, $LiNi_{0.8}Co_{0.1}Mn_{0.1}O_2$, $LiNi_{0.88}Co_{0.01}Mn_{0.02}O_2$, $LiNi_{0.8}Co_{0.15}Al_{0.05}O_2$, $LiNi_{0.8}Co_{0.1}Al_{0.1}O_2$, or $LiNi_{0.88}Co_{0.1}Al_{0.02}O_2$.

In an implementation, the cathode active material may include, e.g., Li—Ni—Co—Al (NCA), Li—Ni—Co—Mn (NCM), lithium cobalt oxide ($LiCoO_2$), lithium manganese oxide ($LiMnO_2$), lithium nickel oxide ($LiNiO_2$), or lithium iron phosphate ($LiFePO_4$).

In an implementation, the anode active material includes at least one selected from a silicon compound (e.g., a silicon oxide, $SiO_x$, in which $0<x<2$), a carbon compound, or a composite of the silicon compound and the carbon compound. The silicon compound may be, e.g., silicon particles, silicon alloy particles, or the like.

In an implementation, the size of the silicon compound may be less than 200 nm, e.g., 10 nm to 150 nm. The term "size" indicates an average particle diameter when the silicon compound is spherical, and indicates an average length of the long or major axis length when the silicon compound is non-spherical.

When the size of the silicon compound is within the above ranges, lifetime characteristics may be excellent, and thus, the lifetime of a lithium secondary battery may be further improved when the electrolyte according to an embodiment is used.

The carbon material may be, e.g., crystalline carbon, amorphous carbon, or a mixture thereof. The crystalline carbon may be, e.g., amorphous, plate-like, flake-like, spherical or fibrous natural graphite or artificial graphite, and the amorphous carbon may be soft carbon (low-temperature calcined carbon), hard carbon, mesophase pitch carbide, or calcined coke.

The composite of the silicon compound and the carbon compound may be, e.g., a composite in which silicon nanoparticles are arranged on the carbon compound, a composite in which silicon particles are arranged on the surface of the carbon compound and inside the carbon compound, or a composite in which silicon particles is coated with the carbon compound and included in the carbon compound. In the composite of the silicon compound and the carbon compound, the carbon compound may be graphite, graphene, graphene oxide, or a combination thereof.

The composite of the silicon compound and the carbon compound may be, e.g., an active material obtained by dispersing silicon nanoparticles having an average particle diameter of about 200 nm on carbon compound particles and then carbon-coating the silicon nanoparticles, or an active material in which silicon (Si) particles exists on graphite and in graphite. The composite of the silicon compound and the carbon compound may have an average secondary particle diameter of, e.g., about 5 μm to about 20 μm. The average particle diameter of silicon nanoparticles may be 5 nm or more, e.g., 10 nm or more, 20 nm or more, 50 nm or more, or 70 nm or more. The average particle diameter of silicon nanoparticles may be, e.g., 200 nm or less, 150 nm or less, 50 nm or less, 20 nm or less, or 10 nm or less. For example, the average particle diameter of silicon nanoparticles may be about 100 nm to about 150 nm.

The composite of the silicon compound and the carbon compound may have an average secondary particle diameter of, e.g., about 5 μm to about 18 μm, about 7 μm to about 15 μm, or about 10 μm to about 13 μm.

The composite of the silicon compound and the carbon compound according to an embodiment may be a porous silicon composite cluster including a porous core containing porous silicon composite secondary particles and a shell containing second graphene and disposed on the porous core. The porous silicon composite secondary particles may include aggregates of two or more silicon composite primary particles. The silicon composite primary particles may be a porous silicon composite cluster including, e.g., silicon, silicon oxide ($SiO_x$) ($0<x<2$) on the silicon, and first graphene on the silicon oxide. The composite of the silicon compound and the carbon compound according to another embodiment may include, e.g., a porous silicon composite cluster including porous silicon composite secondary particles and second carbon flakes on at least one surface of the porous silicon composite secondary particles; and a carbon coating film including amorphous carbon on the porous silicon composite cluster. The porous silicon composite secondary particles may include aggregates of two or more silicon composite primary particles. The silicon composite primary particles may include, e.g., silicon, silicon oxide ($SiO_x$) ($0<x<2$) on the silicon, and first carbon flakes on the silicon oxide. The silicon oxide may exist in the form of a film, a matrix, or a combination thereof.

The first carbon flakes and the second carbon flakes may be present in the form of a film, particles, a matrix, or a combination thereof, respectively. The first carbon flakes and the second carbon flakes may be graphene, graphite, carbon fiber, graphene oxide, or the like, respectively.

The aforementioned composite of the silicon compound and the carbon compound may be, e.g., an active material obtained by dispersing silicon (Si) particles on graphite particles and then coating the silicon (Si) particles with a carbon compound, an active material in which silicon (Si) particles exist on graphite and in graphite, or a composite in which silicon (Si) particles are coated with a carbon compound.

The average particle diameter of the Si particles may be, e.g., 50 to 200 nm, 100 to 180 nm, or about 150 nm. The composite of the silicon compound and the carbon compound may include, e.g., a suitable porous silicon composite cluster.

The direct current internal resistance (DCIR) increase rate of the lithium secondary battery according to an embodiment after charge-discharge of 3 cycles at 25° C. and then storage at high temperature (60° C.) for 30 days may be 125% or less, e.g., 124% or less.

The lithium secondary battery of the present disclosure may provide a high power by providing a high energy density.

The lithium battery may include, e.g. a lithium primary battery as well as a lithium secondary battery such as a lithium ion battery, a lithium ion polymer battery, or a lithium sulfur battery.

The operating voltage of the lithium secondary battery may be 4.2 V or more, for example, 4.3 V or more, for example, 4.45 V or more.

For example, the lithium secondary battery may be manufactured by the following method.

First, a cathode may be prepared

For example, a cathode active material composition in which a cathode active material, a conductive material, a binder, and a solvent are mixed may be prepared. A cathode plate may be prepared by coating a cathode current collector with the cathode active material composition. In an implementation, the cathode plate may be prepared by casting the cathode active material composition onto a separate support, separating a film from the support and then laminating the separated film on a metal current collector.

The cathode active material may be, e.g., a suitable lithium-containing metal oxide. The lithium-containing metal oxide may include, e.g., two or more kinds of composite oxides of lithium and a metal selected from cobalt, manganese, nickel, and combinations thereof. For example, as lithium-containing metal oxide, a compound represented by any one of Formulae of $Li_aA_{1-b}B'_bD_2$ (where, $0.90 \leq a \leq 1.8$ and $0 \leq b \leq 0.5$ are satisfied); $Li_aE_{1-b}B'_bO_{2-c}D_c$ (where, $0.90 \leq a \leq 1.8$, $0 \leq b \leq 0.5$, and $0 \leq c \leq 0.05$ are satisfied); $LiE_{2-b}B'_bO_{4-c}D_c$ (where, $0 \leq b \leq 0.5$ and $0 \leq c \leq 0.05$ are satisfied); $Li_aNi_{1-b-c}Co_bB'_cD_\alpha$ (where, $0.90 \leq a \leq 1.8$, $0 \leq b \leq 0.5$, $0 \leq c \leq 0.05$, and $0 < \alpha \leq 2$ are satisfied); $Li_aNi_{1-b-c}Co_bB'_cO_{2-\alpha}F'_\alpha$ (where, $0.90 \leq a \leq 1.8$, $0 \leq b \leq 0.5$, $0 \leq c \leq 0.05$, and $0 < \alpha < 2$ are satisfied); $Li_aNi_{1-b-c}Co_bB'_cO_{2-\alpha}F'_2$ (where, $0.90 \leq a \leq 1.8$, $0 \leq b \leq 0.5$, $0 \leq c \leq 0.05$, and $0 < \alpha < 2$ are satisfied); $Li_aNi_{1-b-c}Mn_bB'_cD_\alpha$ (where, $0.90 \leq a \leq 1.8$, $0 \leq b \leq 0.5$, $0 \leq c \leq 0.05$, and $0 < \alpha \leq 2$ are satisfied); $Li_aNi_{1-b-c}Mn_bB'_cO_{2-\alpha}F'_\alpha$ (where, $0.90 \leq a \leq 1.8$, $0 \leq b \leq 0.5$, $0 \leq c \leq 0.05$, and $0 < \alpha < 2$ are satisfied); $Li_aNi_{1-b-c}Mn_bB'_cO_{2-\alpha}F'_2$ (where, $0.90 \leq a \leq 1.8$, $0 \leq b \leq 0.5$, $0 \leq c \leq 0.05$, and $0 < \alpha < 2$ are satisfied); $Li_aNi_bE_cG_dO_2$ (where, $0.90 \leq a \leq 1.8$, $0 \leq b \leq 0.9$, $0 \leq c \leq 0.5$, and $0.001 \leq d \leq 0.1$ are satisfied); $Li_aNi_bCo_cMn_dGeO_2$ (where, $0.90 \leq a \leq 1.8$, $0 \leq b \leq 0.9$, $0 \leq c \leq 0.5$, $0 \leq d \leq 0.5$, and $0.001 \leq e \leq 0.1$ are satisfied); $Li_aNiG_bO_2$ (where, $0.90 \leq a \leq 1.8$ and $0.001 \leq b \leq 0.1$ are satisfied); $Li_aCoG_bO_2$ (where, $0.90 \leq a \leq 1.8$ and $0.001 \leq b \leq 0.1$ are satisfied); $Li_aMnG_bO_2$ (where, $0.90 \leq a \leq 1.8$ and $0.001 \leq b \leq 0.1$ are satisfied); $Li_aMn_2G_bO_4$ (where, $0.90 \leq a \leq 1.8$ and $0.001 \leq b \leq 0.1$ are satisfied); $QO_2$; $QS_2$; $LiQS_2$; $V_2O_5$; $LiV_2O_5$; $LiI'O_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$ may be used.

In Formulae above, A may be, e.g., Ni, Co, Mn, or a combination thereof; B' may be, e.g., Al, Ni, Co, Mn, Cr, Fe, Mg, Sr, V, a rare earth element, or a combination thereof; D may be, e.g., O, F, S, P, or a combination thereof; E is Co, Mn, or a combination thereof; F' may be, e.g., F, S, P, or a combination thereof; G may be, e.g., Al, Cr, Mn, Fe, Mg, La, Ce, Sr, V, or a combination thereof; Q may be, e.g., Ti, Mo, Mn, or a combination thereof; I' may be, e.g., Cr, V, Fe, Sc, Y, or a combination thereof; and J may be, e.g., V, Cr, Mn, Co, Ni, Cu, or a combination thereof.

For example, the lithium-containing metal oxide may be $LiCoO_2$, $LiMn_gO_{2g}$ (g=1 or 2), $LiNi_{1-g}Mn_gO_{2g}$ (0<g<1), $LiNi_{1-g-k}Co_gMn_kO_2$ ($0 \leq g \leq 0.5$, $0 \leq k \leq 0.5$), or $LiFePO_4$.

In an implementation, the cathode may include a cathode active material having a layered structure.

In an implementation, the cathode active material includes a lithium transition metal oxide containing nickel and at least one transition metal, and the content of the nickel may be 80 mol % or more based on the total mole number of the transition metal. When a lithium transition metal oxide having a high nickel content is used as a cathode active material, a lithium secondary battery having a high power and a high capacity may be manufactured.

The lithium transition metal oxide may be a compound represented by Formula 6.

  <Formula 16>

$Li_aNi_xCo_yM_zO_{2-b}A_b$

In Formula 16, $1.0 \leq a \leq 1.2$, $0 \leq b \leq 0.2$, $0.6 \leq x < 1$, $0 < y \leq 0.3$, $0 < z \leq 0.3$, and x+y+z=1 may be satisfied; M may be, e.g., manganese (Mn), vanadium (V), magnesium (Mg), gallium (Ga), silicon (Si), tungsten (W), molybdenum (Mo), iron (Fe), chromium (Cr), copper (Cu), zinc (Zn), titanium (Ti), aluminum (Al), or boron (B); and A may be, e.g., F, S, Cl, Br, or a combination thereof.

In an implementation, the lithium transition metal oxide may be represented by one of Formula 17 or 18.

  <Formula 17>

$LiNi_xCo_yMn_zO_2$

In Formula 17, $0.6 \leq x \leq 0.95$, $0 < y \leq 0.3$, $0 < z \leq 0.3$, and x+y+z=1 may be satisfied.

  <Formula 18>

$LiNi_xCo_yAlO_2$

In Formula 18, $0.6 \leq x \leq 0.95$, $0 < y \leq 0.3$, $0 < z \leq 0.3$, and x+y+z=1 may be satisfied.

In an implementation, a compound having a coating layer on the surface of the compound may be used, or a mixture of the compound and a compound having a coating layer may be used. The coating layer may include a coating element compound of an oxide of a coating element, a hydroxide of a coating element, an oxyhydroxide of a coating element, an oxycarbonate of a coating element, or a hydroxycarbonate of a coating element. The compound constituting this coating layer may be amorphous or crystalline. As the coating element included in the coating layer, Mg, Al, Co, K, Na, Ca, Si, Ti, V, Sn, Ge, Ga, B, As, Zr, or a mixture thereof may be used. In the process of forming the coating layer, a suitable coating method may be used as long as this compound may be coated with such elements by a method that does not adversely affect the physical properties of the cathode active material (for example, spray coating, dipping, or the like).

The conductive material is used to impart conductivity to an electrode. In the battery, a suitable conductive material may be used as long as it is an electroconductive material not causing a chemical change. Examples of the conductive material may include carbon compounds such as natural graphite, artificial graphite, carbon black, acetylene black, Ketjen black, and carbon fiber; metal-based materials including metal powder such as copper, nickel, aluminum, and silver, and metal fiber; conductive polymers such as polyphenylene derivatives; and mixtures thereof.

As the conductive material, e.g., carbon black, graphite fine particles, or the like may be used.

In an implementation, the binder may include, e.g., a vinylidene fluoride/hexafluoropropylene copolymer, polyvinylidene fluoride (PVDF), polyacrylonitrile, polymethylmethacrylate, polytetrafluoroethylene and mixtures thereof, or a styrene butadiene rubber polymer.

In an implementation, the solvent may include, e.g., N-methylpyrrolidone, acetone, water, or the like.

The content of the cathode active material, the content of the conductive material, the content of the binder, and the content of the solvent may be at suitable levels for a lithium secondary battery. In an implementation, at least one of the conductive material, the binder, and the solvent may be omitted depending on the use and configuration of the lithium secondary battery.

Next, an anode is prepared.

For example, an anode active material composition in which an anode active material, a conductive material, a binder, and a solvent are mixed may be prepared. An anode plate may be prepared by directly coating an anode current collector with the anode active material composition and drying the anode active material composition. Alternatively, the anode plate may be prepared by casting the anode active material composition onto a separate support, separating a film from the support and then laminating the separated film on a metal current collector.

The anode active material may include, e.g. a silicon material, a carbon material, a silicon oxide ($SiO_x$ (0<x<2)), or a composite of the silicon-based material and the carbon compound.

The anode active material may be a suitable active material, e.g., a lithium metal, a metal alloyable with lithium, a transition metal oxide, a non-transition metal oxide, or a carbon compound.

In addition to the aforementioned anode active material, a suitable anode active material may be included. In an implementation, the metal alloyable with lithium may be Si, Sn, Al, Ge, Pb, Bi, Sb, a Si—Y' alloy (in which Y' may be an alkaline metal, an alkaline earth metal, a Group 13 element, a Group 14 element, a transition metal, or a combination thereof, not Si), or a Sn—Y' alloy (in which Y' may be an alkaline metal, an alkaline earth metal, a Group 13 element, a Group 14 element, a transition metal, or a combination thereof, not Sn). The element Y' may be, e.g., Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, or Te.

In an implementation, the anode active material may include lithium titanium oxide, vanadium oxide, lithium vanadium oxide, or the like.

The conductive material and the binder in the anode active material composition may be the same as those in the cathode active material composition.

In the anode active material composition, water may be used as the solvent. For example, water may be used as the solvent, carboxymethyl cellulose (CMC), styrene-butadiene rubber (SBR), an acrylate polymer, or a methacrylate polymer may be used as the binder, and carbon black, acetylene black, or graphite may be used as the conductive material.

The content of the anode active material, the content of the conductive material, the content of the binder, and the content of the solvent may be at levels suitable for a lithium secondary battery. In an implementation, at least one of the conductive material, the binder, and the solvent may be omitted depending on the use and configuration of the lithium secondary battery.

In an implementation, 94 wt % of the anode active material, 3 wt % of the binder, 3 wt % of the conductive material may be mixed in a power state, water is added to the mixture to a solid content of about 70 wt % to make a slurry, and then the slurry may be coated, dried, and rolled to fabricate an anode.

As the anode active material, a composite of silicon and a carbon compound may be used.

The carbon compound may be, e.g., graphite, graphene, carbon fiber, graphene oxide, or a combination thereof.

Next, a separator to be inserted between the anode and the cathode may be prepared.

The separator may be a suitable separator for a lithium battery. A separator having low resistance to the movement of ions in the electrolyte and superior in electrolyte wettability may be used. In an implementation, the separator may include, e.g., glass fiber, polyester, Teflon, polyethylene, polypropylene, polytetrafluoroethylene (PTFE), or combinations thereof, and may be made in the form of nonwoven fabric or woven fabric. In an implementation, a windable separator including polyethylene, polypropylene, or the like may be used in a lithium ion battery, and a separator having good electrolyte impregnation ability may be used in a lithium ion polymer battery. For example, the separator may be fabricated by the following method.

A polymer resin, a filler, and a solvent may be mixed to prepare a separator composition. The separator composition may be directly applied on an electrode and dried to form a separator. Alternatively, the separator composition may be cast on a support and dried, a separation film is separated from the support, and then the separation film is laminated on the electrode to form a separator.

The polymer resin may include a suitable polymer resin, e.g., a vinylidene fluoride/hexafluoropropylene copolymer, polyvinylidene fluoride (PVDF), polyacrylonitrile, polymethyl methacrylate, or a mixture thereof.

A loading level of the anode active material composition may be set depending on the loading level of the cathode active material composition. The capacity per g of the anode active material composition is 12 mg/cm$^2$ or more, for example, 15 mg/cm$^2$ or more. The electrode density may be 1.5 g/cc or more, for example 1.6 g/cc or more. As an energy density-oriented design, a design such as a density of 1.65 g/cc or more and 1.9 g/cc or less is preferred.

Next, the aforementioned electrolyte may be prepared.

According to an embodiment, a non-aqueous electrolyte, an organic solid electrolyte, or an inorganic solid electrolyte may be additionally used in addition to the aforementioned electrolyte.

Examples of the organic solid electrolyte may include polyethylene derivatives, polyethylene oxide derivatives, polypropylene oxide derivatives, phosphate ester polymers, polyester sulfides, polyvinyl alcohols, polyvinylidene fluorides, and polymers containing ionic dissociation groups.

Examples of the inorganic solid electrolyte may include $Li_3N$, $LiI$, $Li_5NI_2$, $Li_3N$—$LiI$—$LiOH$, $Li_2SiS_2S_3$, $Li_4SiO_4$, $Li_4SiO_4$—$LiI$—$LiOH$, and $Li_3PO_4$—$Li_2S$—$SiS_2$.

As shown in FIG. 1, the lithium secondary battery 1 may include a cathode 2, an anode 3, and a separator 4. The anode 3, the cathode 2, and the separator 4 may be wound or folded and accommodated in a battery case 5. Then, an electrolyte may be injected into the battery case 5, and the battery case 5 is sealed with a cap assembly 6 to complete the manufacture of the lithium secondary battery 1. The battery case 5 may have, e.g., a cylindrical shape, a rectangular shape, or a thin film shape. In an implementation, the lithium secondary battery 1 may be a large-sized thin-film battery. The lithium secondary battery 1 may be a lithium ion battery.

The separator 4 may be located between the anode 3 and the cathode 2 to form a battery structure or electrode assembly. In an implementation, the battery structure may be laminated as a bi-cell structure and then impregnated with an electrolyte, and the resulting product may be accommodated in a pouch and sealed to complete a lithium ion polymer battery.

In an implementation, the plurality of battery structures may be laminated to form a battery pack, and this battery pack may be used in all appliances requiring high capacity and high power. For example, the battery pack may be used in notebooks, smart phones, electric vehicles, and the like.

In the lithium secondary battery according to an embodiment, a DCIR rise rate may be significantly reduced, and thus, excellent battery characteristics may be exhibited, as compared with a lithium secondary battery employing a nickel rich lithium nickel composite oxide as a cathode active material.

The operating voltage of the lithium secondary battery to which the cathode, the anode, and the electrolyte are applied may have, e.g., a lower limit of 2.5 V to 2.8 V and an upper limit of 4.1 V to 4.4 V, and the energy density thereof is 500 wh/L or more, which is excellent.

The lithium secondary battery may be used in power tools driven by an electric motor; electric vehicles (EV) such as hybrid electric vehicles (HEV) and plug-in hybrid electric vehicles (PHEV); electric motorcycles such as electric bikes and electric scooters; electric golf carts; and power storage systems.

As used herein, the term "alkyl group" refers to a branched or unbranched aliphatic hydrocarbon group. In an embodiment, the alkyl group may be substituted or unsubstituted. Examples of the alkyl group may include, but are not limited to, a methyl group, an ethyl group, a propyl group, an isopropyl group, a butyl group, an isobutyl group, a tert-butyl group, a pentyl group, a hexyl group, a cyclopropyl group, a cyclopentyl group, a cyclohexyl group, and a cycloheptyl group. In another embodiment, these alkyl groups may be selectively substituted. In another embodiment, the alkyl group may include 1 to 6 carbon atoms. Examples of the alkyl group having 1 to 6 carbon atoms may include, but are not limited to, a methyl group, an ethyl group, a propyl group, an iso-propyl group, a butyl group, an iso-butyl group, a sec-butyl group, a pentyl group, a 3-pentyl group, and a hexyl group.

At least one hydrogen atom in the alkyl group may be replaced by a halogen atom, a C1-C20 alkyl group substituted with the halogen atom (for example, $CF_3$, $CHF_2$, $CH_2F$, or $CCl_3$), a C1-C20 alkoxy group, a C2-C20 alkoxyalkyl group, a hydroxy group, a nitro group, a cyano group, an amino group, an amidino group, hydrazine, hydrazone, a carboxyl group or a salt thereof, a sulfonyl group, a sulfamoyl group, a sulfonic acid group or a salt thereof, or phosphoric acid group or a salt thereof, or may be replaced by a C1-C20 alkyl group, a C2-C20 alkenyl group, a C2-C20 alkynyl group, a C1-C20 heteroalkyl group, a C6-C20 aryl group, a C7-C20 arylalkyl group, a C6-C20 heteroaryl group, a C7-C20 heteroarylalkyl group, a C6-C20 heteroaryloxy group, or C6-C20 heteroaryloxyalkyl group.

As used herein, the term "alkenyl group" is a hydrocarbon group having 2 to 20 carbon atoms including at least one carbon-carbon double bond, and examples thereof include, but are not limited to, an ethenyl group, a 1-propenyl group, a 2-propenyl group, a 2-methyl-1-propenyl group, a 1-butenyl group, a 2-butenyl group, a cyclopropenyl group, a cyclopentenyl group, a cyclohexenyl group, and a cycloheptenyl group. In another embodiment, the alkenyl. group may be substituted or unsubstituted. In another embodiment, the number of carbon atoms in the alkenyl group may be 2 to 30.

As used herein, the term "alkynyl group" is a hydrocarbon group having 2 to 20 carbon atoms including at least one carbon-carbon triple bond, and examples thereof include, but are not limited to, an ethynyl group, a 1-propynyl group, a 2-propynyl group, a 1-butynyl group, and a 2-butynyl group. In another embodiment, the alkynyl group may be substituted or unsubstituted. In another embodiment, the number of carbon atoms in the alkynyl group may be 2 to 30.

As used herein, the term "alkoxyalkyl group" refers to a structure in which two branched or unbranched aliphatic hydrocarbon groups are connected by an oxygen atom (O). Examples of the alkoxyalkyl group may include, but are not limited to, a methoxymethyl group, a methoxyethyl group, a methoxypropyl group, a methoxyisopropyl group, a methoxybutyl group, a methoxytert-butyl group, a methoxypentyl group, a methoxyhexyl group, a methoxycyclopentyl group, a methoxycyclohexyl group, a methoxycycloheptyl group, an ethoxymethyl group, an ethoxyethyl group, an ethoxypropyl group, an ethoxyisopropyl group, an ethoxytert-butyl group, an ethoxypentyl group, an ethoxyhexyl group, an ethoxycyclopropyl group, an ethoxycyclopentyl group, an ethoxycyclohexyl group, and an ethoxycycloheptyl group. In another embodiment, each of them may be selectively substituted. For example, the alkoxyalkyl group may be an alkoxy-substituted alkyl group.

As used herein, a substituent may be derived from an unsubstituted parent group. Here, at least one hydrogen atom may be substituted with another atom or functional group. Unless otherwise expressed, when a functional group is considered "substituted", it means that the functional group is substituted with at least one substituent selected from a $C_1$-$C_{20}$ alkyl group, a $C_2$-$C_{20}$ alkenyl group, a $C_2$-$C_{20}$ alkynyl group, a $C_1$-$C_{20}$ alkoxy group, halogen, a cyano group, a hydroxy group, and a nitro group. When it is described that one functional group is "selectively substituted", the functional group may be substituted with the aforementioned substituent.

The term "halogen" includes fluorine, bromine, chlorine, and iodine.

"Alkoxy" represents "alkyl-O—", and alkyl is as described above. Examples of the alkoxy group may include a methoxy group, an ethoxy group, a 2-propoxy group, a butoxy group, a t-butoxy group, a pentyloxy group, and a hexyloxy group. At least one hydrogen atom of the alkoxy may be substituted with the same substituent as in the aforementioned alkyl group.

"Heteroaryl" refers to a monocyclic or bicyclic organic group including at least one heteroatom selected from N, O, P and S and other cyclic carbon atoms. The heteroaryl group may include 1 to 5 heteroatoms, and may include 5 to 10 ring members. The S or N may be oxidized to have various oxidation states.

Examples of heteroaryl may include thienyl, furyl, pyrrolyl, imidazolyl, pyrazolyl, thiazolyl, isothiazolyl, 1,2,3-oxadiazolyl, 1,2,4-oxadiazolyl, 1,2,5-oxadiazolyl, 1,3,4-oxadiazolyl, 1,2,3-thiadiazolyl, 1,2,4-thiadiazolyl, 1,2,5-thiadiazolyl, 1,3,4-thiadiazolyl, isothiazol-3-yl, isothiazol-4-yl, isothiazol-5-yl, oxazol-2-yl, oxazol-4-yl, oxazol-5-yl, isoxazol-3-yl, isoxazol-4-yl, isoxazol-5-yl, 1,2,4-triazol-3-yl, 1,2,4-triazol-5-yl, 1,2,3-triazol-4-yl, 1,2,3-triazol-5-yl, tetrazolyl, pyrid-2-yl, Pyrid-3-yl, 2-pyrazin-2yl, pyrazin-4-yl, pyrazin-5-yl, 2-pyrimidin-2-yl, 4-pyrimidin-2-yl, and 5-pyrimidine-2-yl.

The term "heteroaryl" includes a case where a heteroaromatic ring is selectively fused to at least one aryl, cycloaliphatic, or heterocyclic group.

The term "carbon ring" or "carbocyclic group" refers to a saturated or partially unsaturated non-aromatic monocyclic, bicyclic or tricyclic hydrocarbon group.

Examples of the monocyclic hydrocarbon group include cyclopentyl, cyclopentenyl, cyclohexyl, and cyclohexenyl.

Examples of the bicyclic hydrocarbon group include carbonyl, decahydronaphthyl, bicyclo [2.1.1] hexyl, bicyclo [2.2.1]heptyl, bicyclo[2.2.1]heptenyl, and bicyclo[2.2.2]octyl).

An example of the tricyclic hydrocarbon group includes adamantyl.

At least one hydrogen atom in the carbon ring may be substituted with the same substituent as in the aforementioned alkyl group.

The following Examples and Comparative Examples are provided in order to highlight characteristics of one or more embodiments, but it will be understood that the Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

(Preparation of Electrolyte)

Preparation Example 1

A 1.5 M $LiPF_6$ solution was formed by adding $LiPF_6$ to a mixed solution in which ethylene carbonate (EC), ethyl methyl carbonate (EMC), and dimethyl carbonate (DMC) were mixed at a volume ratio of 2:1:7, and then a compound of Formula 4 below was further added thereto, to prepare an electrolyte for a lithium secondary battery.

The content of the compound of Formula 4 was about 0.5 wt %, based on the total weight of the electrolyte.

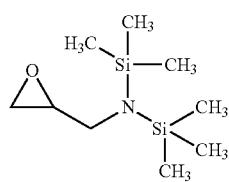

<Formula 4>

Preparation Example 2

An electrolyte for a lithium secondary battery was prepared in the same manner as in Preparation Example 1, except that the content of the compound of Formula 4 was about 1 wt %, based on the total weight of the electrolyte.

Preparation Example 3

An electrolyte for a lithium secondary battery was prepared in the same manner as in Preparation Example 1, except that the content of the compound of Formula 4 was about 3 wt %, based on the total weight of the electrolyte.

Preparation Example 4

An electrolyte for a lithium secondary battery was prepared in the same manner as in Preparation Example 1, except that the content of the compound of Formula 4 was about 5 wt %, based on the total weight of the electrolyte.

Comparative Preparation Example 1

An electrolyte for a lithium secondary battery was prepared in the same manner as in Preparation Example 1, except that the compound of Formula 4 was not added.

Comparative Preparation Example 2

An electrolyte for a lithium secondary battery was prepared in the same manner as in Preparation Example 1, except that 2-(methoxymethyl) oxirane, represented by Formula 19 below, was used instead of the compound of Formula 4 above.

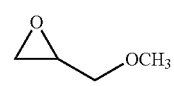

<Formula 19>

Comparative Preparation Example 3

An electrolyte for a lithium secondary battery was prepared in the same manner as in Preparation Example 1, except that bis(trimethylsilyl) amine, represented by Formula 20 below, was used instead of the compound of Formula 4 above.

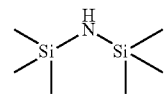

<Formula 20>

(Manufacture of Lithium Secondary Battery)

Example 1

87 wt % of graphite, 11 wt % of a composite of the silicon compound and the carbon compound, 1 wt % of a styrene-butadiene rubber (SBR) binder (ZEON), and 1.0 wt % of carboxymethyl cellulose binder (CMC, manufactured by NIPPON A&L) were mixed, introduced into distilled water, and then stirred for 60 minutes using a mechanical stirrer to prepare an anode active material slurry. The slurry was applied onto a 10 μm thick copper current collector to a thickness of about 60 μm using a doctor blade, dried at 100° C. for 0.5 hours using a hot air dryer, further dried in vacuum at 120° C. for 4 hours, and then roll-pressed to prepare an anode.

As the composite of the silicon compound and the carbon compound, a carbon-silicon composite (manufactured by BTR Co., Ltd.) including carbon-coated silicon particles was used.

(Preparation of Cathode)

97 wt % of $LiNi_{0.88}Co_{0.08}Mn_{0.04}O_2$, 0.5 wt % of artificial graphite (SFG6, Timcal) powder as a conductive material, 0.8 wt % of carbon black (Ketjenblack, ECP), 0.2 wt % of modified acrylonitrile rubber (BM-720H, manufactured by Zeon Corporation), 1.2 wt % of polyvinylidene fluoride (PVdF, S6020, Solvay), and 0.3 wt % of polyvinylidene fluoride (PVdF, S5130, Solvay) were mixed, introduced into an N-methyl-2-pyrrolidone solvent, and then stirred for 30 minutes using a mechanical stirrer to prepare a cathode active material slurry. The slurry was applied onto a 20 μm thick aluminum current collector to a thickness of about 60 μm using a doctor blade, dried at 100° C. for 0.5 hours using a hot air dryer, further dried in vacuum at 120° C. for 4 hours, and then roll-pressed to prepare a cathode.

A lithium secondary battery was manufactured by using a polyethylene separator having a thickness of 14 μm and coated with ceramic on a side of anode and using the electrolyte prepared in Preparation Example 1.

Examples 2 to 4

Lithium secondary batteries were manufactured in the same manner as in Example 1, except that each of the electrolytes prepared in Preparation Examples 2 to 4 was used instead of the electrolyte prepared in Preparation Example 1.

Comparative Examples 1 to 3

Lithium secondary batteries were manufactured in the same manner as in Example 1, except that each of the electrolytes prepared in Comparative Preparation Examples 1 to 3 was used instead of the electrolyte prepared in Preparation Example 1.

Evaluation Example 1: Tests of Initial Direct Current Internal Resistance (DCIR) at Ambient Temperature (25° C.) and a DCIR Increase Rate after High-Temperature Storage The lithium secondary batteries manufactured in Examples 1 to 4 and Comparative Examples 1 to 3 were tested under the condition of 1 C/10 second discharge (SOC 100) at 25° C. to measure initial direct current internal resistances (DCIR). Then, initial DC internal resistances (DCIRs) were calculated as the value of $\Delta V/\Delta I$ (voltage change/current change with respect to the lithium secondary batteries before high-temperature storage in an oven of Evaluation Example 2 at 60° C. Some of the results thereof are shown in Table 1. Further, after the initial DCIR was measured, the maximum energy state in the batteries were made to be fully charged (SOC 100%). In this state, the batteries were stored at high temperature (60° C.) for 30 days, and then DCIRs were measured, and a DCIR increase rate (%) was calculated by Equation 1 below.

DCIR increase rate=(DCIR after 30 days/initial DCIR)×100%  [Equation 1]

TABLE 1

| Class. | Initial direct current internal resistance (DCIR) (mΩ) | DCIR (mΩ) after 30 days | DCIR increase rate (%) |
| --- | --- | --- | --- |
| Example 1 | 28.0 | 50.97 | 124 |
| Example 2 | 28.0 | 49.48 | 121 |
| Example 3 | 28.1 | 47.92 | 117 |
| Example 4 | 28.2 | 47.20 | 116 |
| Comparative Example 1 | 41.52 | 52.19 | 126 |
| Comparative Example 2 | 41.23 | 52.07 | 126 |
| Comparative Example 3 | 41.18 | 54.92 | 133 |

When the initial DCIR of the lithium secondary battery is high, the output power characteristics of the lithium secondary battery may be significantly deteriorated, and thus it may be difficult to apply the lithium secondary battery to applications requiring high output such as an electric vehicle. As may be seen in Table 1, the initial DCIRs of the lithium secondary batteries of Examples 1 to 4 were greatly reduced, as compared with those of the lithium secondary batteries of Comparative Examples 1 to 3. From the results, it may be seen that in the lithium secondary batteries of Examples 1 to 4, e.g., when an electrolyte containing the compound of Formula 4 was used, output characteristics may be improved.

As may be seen in Table 1, even when the lithium secondary batteries of Examples 1 to 4 were stored at high temperature for a long period time, the DCIR increase rates of the lithium secondary batteries of Examples 1 to 4 were remarkably lowered as compared with the DCIR increase rates of the lithium secondary battery of Comparative Example 1 (e.g., not including the compound of Formula 4) and the lithium secondary batteries of Comparative Examples 2 and 3 (e.g., including other additives).

Evaluation Example 2: Evaluation of Charge-Discharge Characteristics at Ambient Temperature (25° C.)

Each of the lithium secondary battery of Example 1 and the lithium secondary batteries of Comparative Examples 1 to 3 was charged with a constant current up to a voltage of 4.3 V (vs. Li) at a current flow rate of 0.1 C at ambient temperature (25° C.), and was then cut-off at a current flow rate of 0.05 C while maintaining 4.3 V at a constant voltage mode. Then, each of the lithium secondary batteries was discharged to a voltage of 2.8 V (vs. Li) at a constant current flow rate of 0.1 C during discharge (formation step, first cycle).

Each of the lithium secondary batteries having undergone the first cycle of the formation step was charged with a constant current up to a voltage of 4.3 V (vs. Li) at a current flow rate of 0.2 C at ambient temperature (25° C.), and was then cut-off at a current flow rate of 0.05 C while maintaining 4.3 V at a constant voltage mode. Then, each of the lithium secondary batteries was discharged to a voltage of 2.8 V (vs. Li) at a constant current flow rate of 0.2 C during discharge (formation step, second cycle).

Each of the lithium secondary batteries having undergone the second cycle of the formation step was charged with a constant current up to a voltage of 4.3 V (vs. Li) at a current flow rate of 0.5 C at ambient temperature (25° C.), and was then cut-off at a current flow rate of 0.05 C while maintaining 4.3 V at a constant voltage mode. Then, each of the lithium secondary batteries was discharged to a voltage of 2.8 V (vs. Li) at a constant current flow rate of 1.0 C during discharge. These charge-discharge cycles were repeated 200 times.

In all of the charge-discharge cycles, a stop time of 10 minutes was allowed after one charge-discharge cycle.

Some of the charge-discharge experimental results are shown in Table 2. The capacity retention rate at $200^{th}$ cycle is represented by Equation 2.

Capacity retention rate=[discharge capacity at $200^{th}$ cycle/discharge capacity at first cycle]×100  <Equation 2>

Evaluation Example 3: Evaluation of Gas Generation Amount at Ambient Temperature Each of the lithium secondary battery of Example 1 and the lithium secondary batteries of Comparative Examples 1 to 3 was charged with a constant current up to 4.3 V at a flow rate of 0.5 C at ambient temperature (25° C.) during a first cycle, charged with a constant voltage up to a current of 0.05 C while maintaining 4.3 V, and then discharged to 2.8 V at a flow rate of 0.5 C. This charge-discharge process was performed two more times to complete a formation process.

During a second cycle, each of the lithium secondary batteries was charged with a constant current up to 4.3 V at a flow rate of 0.5 C, charged with a constant voltage up to a current of 0.05 C while maintaining 4.3 V, and then discharged to 2.8 V at a flow rate of 0.5 C.

During a third cycle, each of the lithium secondary batteries was charged with a constant current up to 4.3 V at a flow rate of 0.5 C, charged with a constant voltage up to a current of 0.05 C while maintaining 4.3 V, and then discharged to 2.8 V at a flow rate of 0.5 C.

During a fourth cycle, each of the lithium secondary batteries was charged with a constant current up to 4.3 V at a flow rate of 0.5 C, and then charged with a constant voltage up to a current of 0.05 C while maintaining 4.3 V. Then, each of the charged lithium secondary batteries was stored in an oven at 60° C. for 10 days, taken out from the oven, and then discharged to 2.8 V. Then, each of the discharged lithium secondary batteries was put into a jig and burst, and then an internal gas pressure change was measured. Then, gas generation amount was measured by converting the internal gas pressure change into volume.

Some of the results thereof are shown in Table 2 below. The gas generation amount is represented as a relatively reduced value based on the gas generation amount of the Comparative Examples.

TABLE 2

| Class. | Capacity retention rate (%) at ambient temperature | Gas reduction rate (%) after charge and discharge at ambient temperature |
|---|---|---|
| Example 1 | 93 | 50 |
| Comparative Example 1 | 94 | 0 |
| Comparative Example 2 | 94 | 70 |
| Comparative Example 3 | 94 | 75 |

As may be seen in Table 2, the gas generation amount of the lithium secondary battery of Example 1 (employing an organic electrolyte including the compound of Formula 4) was greatly reduced as compared with the gas generation amounts of the lithium secondary batteries of Comparative Examples 1 to 3. In addition, the capacity retention rate of the lithium secondary battery of Example 1 at ambient temperature was approximately equal to the capacity retention rates of the lithium secondary batteries of Comparative Examples 1 to 3 at ambient temperature, resulting in excellent results.

By way of summation and review, when an organic electrolyte including a lithium salt is used as the electrolyte for lithium secondary batteries, lifetime characteristics and high-temperature stability of a lithium secondary battery could be deteriorated as a result of a side reaction between anode/cathode and an electrolyte.

One or more embodiments may provide an electrolyte for lithium secondary batteries, which is capable of providing a lithium secondary battery having improved lifetime characteristics and high-temperature stability.

According to an embodiment, when an electrolyte including an additive for an electrolyte for a lithium secondary battery is used, a lithium secondary battery having reduced initial DCIR and improved power characteristics and high-temperature characteristics may be manufactured.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An electrolyte for a lithium secondary battery, the electrolyte comprising:
   a lithium salt;
   a non-aqueous organic solvent; and
   an additive, the additive including a compound represented by Formula 1 below:

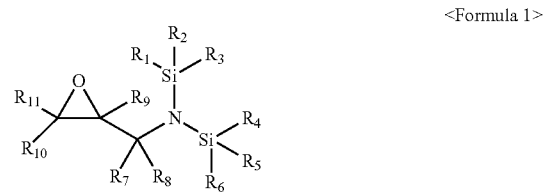

<Formula 1> wherein, in Formula 1,
$R_1$ to $R_6$ are each independently a substituted or unsubstituted $C_1$-$C_{30}$ alkyl group, a substituted or unsubstituted $C_1$-$C_{30}$ alkoxyalkyl group, a substituted or unsubstituted $C_4$-$C_{30}$ carbocyclic group, a substituted or unsubstituted $C_6$-$C_{30}$ aryl group, a substituted or unsubstituted $C_2$-$C_{30}$ alkenyl group, a substituted or unsubstituted $C_2$-$C_{30}$ alkynyl group, or a substituted or unsubstituted $C_2$-$C_{30}$ heteroaryl group;
$R_7$ and $R_8$ are each independently hydrogen, a substituted or unsubstituted $C_1$-$C_{30}$ alkyl group, a substituted or unsubstituted $C_1$-$C_{30}$ alkoxyalkyl group, a substituted or unsubstituted $C_4$-$C_{30}$ carbocyclic group, a substituted or unsubstituted $C_6$-$C_{30}$ aryl group, a substituted or unsubstituted $C_2$-$C_{30}$ alkenyl group, a substituted or unsubstituted $C_2$-$C_{30}$ alkynyl group, or a substituted or unsubstituted $C_2$-$C_{30}$ heteroaryl group; and
$R_9$ to $R_{11}$ are each independently hydrogen, fluorine, a substituted or unsubstituted $C_1$-$C_{30}$ alkyl group, a substituted or unsubstituted $C_1$-$C_{30}$ alkoxyalkyl group, a substituted or unsubstituted $C_4$-$C_{30}$ carbocyclic group, a substituted or unsubstituted $C_6$-$C_{30}$ aryl group, a substituted or unsubstituted $C_2$-$C_{30}$ alkenyl group, a substituted or unsubstituted $C_2$-$C_{30}$ alkynyl group, or a substituted or unsubstituted $C_2$-$C_{30}$ heteroaryl group.

2. The electrolyte as claimed in claim 1, wherein, in Formula 1, $R_1$ to $R_6$ are each independently an unsubstituted $C_1$-$C_{30}$ alkyl group; an unsubstituted $C_1$-$C_{30}$ alkoxyalkyl group; a $C_1$-$C_{30}$ alkyl group substituted with at least one selected from a methyl group, an ethyl group, a propyl group, a butyl group, —F, —Cl, —Br, —I, a cyano group, a hydroxy group, and a nitro group; a $C_2$-$C_{30}$ alkenyl group substituted with at least one selected from a methyl group, an ethyl group, a propyl group, a butyl group, —F, —Cl, —Br, —I, a cyano group, a hydroxy group, and a nitro group; a $C_1$-$C_{30}$ alkoxyalkyl group substituted with at least one selected from a methyl group, an ethyl group, a propyl group, a butyl group, —F, —Cl, —Br, —I, a cyano group, a hydroxy group, and a nitro group; or a C2-C30 alkynyl group substituted with at least one selected from a methyl group, an ethyl group, a propyl group, a butyl group, —F, —Cl, —Br, —I, a cyano group, a hydroxy group, and a nitro group.

3. The electrolyte as claimed in claim 1, wherein, in Formula 1,
$R_7$ and $R_8$ are each independently hydrogen or a substituted or unsubstituted $C_1$-$C_{10}$ alkyl group, and
$R_9$ to $R_{11}$ are each independently hydrogen, fluorine, or a substituted or unsubstituted $C_1$-$C_{10}$ alkyl group.

4. The electrolyte as claimed in claim 1, wherein the compound represented by Formula 1 is a compound represented by Formula 2:

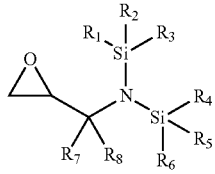

<Formula 2> wherein, in Formula 2, $R_1$ to $R_6$ are each independently a substituted or unsubstituted $C_1$-$C_{30}$ alkyl group, a substituted or unsubstituted $C_1$-$C_{30}$ alkoxyalkyl group, a substituted or unsubstituted $C_4$-$C_{30}$ carbocyclic group, a substituted or unsubstituted $C_6$-$C_{30}$ aryl group, a substituted or unsubstituted $C_2$-$C_{30}$ alkenyl group, a substituted or unsubstituted $C_2$-$C_{30}$ alkynyl group, or, a substituted or unsubstituted $C_2$-$C_{30}$ heteroaryl group, at least one of $R_1$ to $R_6$ being a substituted $C_1$ alkyl group, a substituted or unsubstituted $C_2$-$C_{30}$ alkyl group, a substituted or unsubstituted $C_1$-$C_{30}$ alkoxyalkyl group, a substituted or unsubstituted $C_4$-$C_{30}$ carbocyclic group, a substituted or unsubstituted $C_6$-$C_{30}$ aryl group, a substituted or unsubstituted $C_2$-$C_{30}$ alkenyl group, a substituted or unsubstituted $C_2$-$C_{30}$ alkynyl group, or, a substituted or unsubstituted $C_2$-$C_{30}$ heteroaryl group; and $R_7$ and $R_8$ are each independently hydrogen, a substituted or unsubstituted $C_1$-$C_{30}$ alkyl group, a substituted or unsubstituted $C_1$-$C_{30}$ alkoxyalkyl group, a substituted or unsubstituted $C_4$-$C_{30}$ carbocyclic group, a substituted or unsubstituted $C_6$-$C_{30}$ aryl group, a substituted or unsubstituted $C_2$-$C_{30}$ alkenyl group, a substituted or unsubstituted $C_2$-$C_{30}$ alkynyl group, or a substituted or unsubstituted $C_2$-$C_{30}$ heteroaryl group.

5. The electrolyte as claimed in claim 1, wherein the compound represented by Formula 1 is a compound represented by Formula 3:

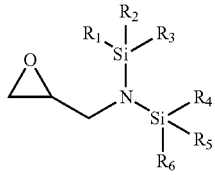

<Formula 3> wherein, in Formula 3, $R_1$ to $R_6$ are each independently a substituted or unsubstituted $C_1$-$C_{30}$ alkyl group, a substituted or unsubstituted $C_1$-$C_{30}$ alkoxyalkyl group, a substituted or unsubstituted $C_4$-$C_{30}$ carbocyclic group, a substituted or unsubstituted $C_6$-$C_{30}$ aryl group, a substituted or unsubstituted $C_2$-$C_{30}$ alkenyl group, a substituted or unsubstituted $C_2$-$C_{30}$ alkynyl group, or, a substituted or unsubstituted $C_2$-$C_{30}$ heteroaryl group, at least one of $R_1$ to $R_6$ being a substituted $C_1$ alkyl group, a substituted or unsubstituted $C_2$-$C_{30}$ alkyl group, a substituted or unsubstituted $C_1$-$C_{30}$ alkoxyalkyl group, a substituted or unsubstituted $C_4$-$C_{30}$ carbocyclic group, a substituted or unsubstituted $C_6$-$C_{30}$ aryl group, a substituted or unsubstituted $C_2$-$C_{30}$ alkenyl group, a substituted or unsubstituted $C_2$-$C_{30}$ alkynyl group, or, a substituted or unsubstituted $C_2$-$C_{30}$ heteroaryl group; and a substituent of the substituted $C_1$-$C_{30}$ alkyl group, the substituted $C_1$-$C_{30}$ alkoxyalkyl group, the substituted $C_4$-$C_{30}$ carbocyclic group, the substituted $C_6$-$C_{30}$ aryl group, the substituted $C_2$-$C_{30}$ alkenyl group, the substituted $C_2$-$C_{30}$ alkynyl group, or the substituted $C_2$-$C_{30}$ heteroaryl group includes at least one selected from a $C_1$-$C_{20}$ alkyl group, a $C_2$-$C_{20}$ alkenyl group, a $C_2$-$C_{20}$ alkynyl group, a $C_1$-$C_{20}$ alkoxy group, halogen, a cyano group, a hydroxy group, and a nitro group.

6. The electrolyte as claimed in claim 1, wherein the compound represented by Formula 1 is a compound represented by one of Formulae 4 to 8:

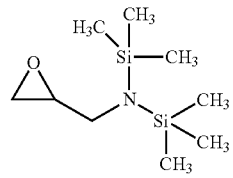

<Formula 4>

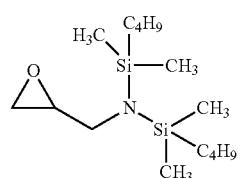

<Formula 5>

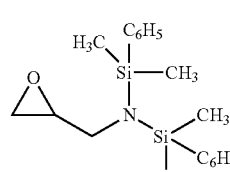

<Formula 6>

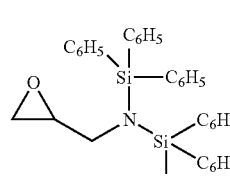

<Formula 7>

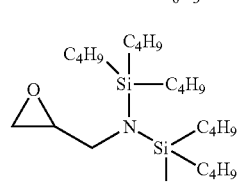

<Formula 8>

7. The electrolyte as claimed in claim 1, wherein the additive is included in the electrolyte in an amount of about 0.1 wt % to about 10 wt %, based on a total weight of the electrolyte.

8. The electrolyte as claimed in claim 1, wherein the additive is included in the electrolyte in an amount of about 0.1 wt % to about 5 wt %, based on a total weight of the electrolyte.

9. The electrolyte as claimed in claim 1, wherein the lithium salt includes LiPF$_6$, LiBF$_4$, LiCF$_3$SO$_3$, Li(CF$_3$SO$_2$)$_2$N, LiC$_2$F$_5$SO$_3$, Li(FSO$_2$)$_2$N, LiC$_4$F$_9$SO$_3$, LiN(SO$_2$CF$_2$CF$_3$)$_2$, or a compound represented by one of Formulae 11 to 14:

<Formula 11>

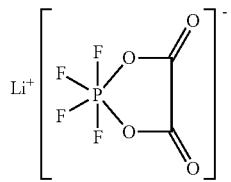

<Formula 12>

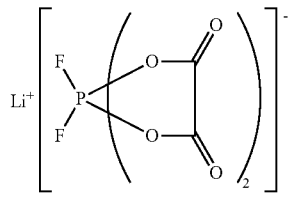

<Formula 13>

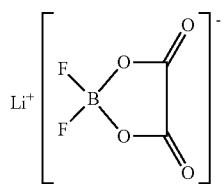

<Formula 14>

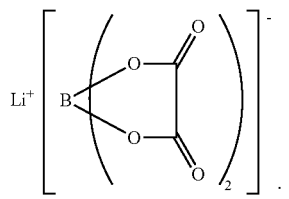

10. The electrolyte as claimed in claim 1, wherein the non-aqueous organic solvent includes ethyl methyl carbonate (EMC), methyl propyl carbonate, ethyl propyl carbonate, dimethyl carbonate (DMC), diethyl carbonate (DEC), dipropyl carbonate, propylene carbonate (PC), ethylene carbonate (EC), fluoroethylene carbonate (FEC), Vinylene carbonate (VC), vinylethylene carbonate (VEC), butylene carbonate, ethylpropionate, ethylbutyrate, dimethylsulfoxide, dimethylformamide, dimethylacetamide, gamma-valerolactone, gamma-butyrolactone, or tetrahydrofuran.

11. A lithium secondary battery, comprising:
a cathode including a cathode active material;
an anode including an anode active material; and
an electrolyte between the cathode and the anode,
wherein the electrolyte includes an additive, the additive including a compound represented by Formula 1 below:

<Formula 1>

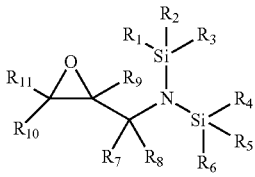

wherein, in Formula 1,
R$_1$ to R$_6$ are each independently a substituted or unsubstituted C1-C30 alkyl group, a substituted or unsubstituted C$_1$-C$_{30}$ alkoxyalkyl group, a substituted or unsubstituted C$_4$-C$_{30}$ carbocyclic group, a substituted or unsubstituted C$_6$-C$_{30}$ aryl group, a substituted or unsubstituted C$_2$-C$_{30}$ alkenyl group, a substituted or unsubstituted C$_2$-C$_{30}$ alkynyl group, or a substituted or unsubstituted C$_2$-C$_{30}$ heteroaryl group;
R$_7$ and R$_8$ are each independently hydrogen, a substituted or unsubstituted C$_1$-C$_{30}$ alkyl group, a substituted or unsubstituted C$_1$-C$_{30}$ alkoxyalkyl group, a substituted or unsubstituted C$_4$-C$_{30}$ carbocyclic group, a substituted or unsubstituted C$_6$-C$_{30}$ aryl group, a substituted or unsubstituted C$_2$-C$_{30}$ alkenyl group, a substituted or unsubstituted C$_2$-C$_{30}$ alkynyl group, or a substituted or unsubstituted C$_2$-C$_{30}$ heteroaryl group; and
R$_9$ to R$_{11}$ are each independently hydrogen, fluorine, a substituted or unsubstituted C$_1$-C$_{30}$ alkyl group, a substituted or unsubstituted C$_1$-C$_{30}$ alkoxyalkyl group, a substituted or unsubstituted C$_4$-C$_{30}$ carbocyclic group, a substituted or unsubstituted C$_6$-C$_{30}$ aryl group, a substituted or unsubstituted C$_2$-C$_{30}$ alkenyl group, a substituted or unsubstituted C$_2$-C$_{30}$ alkynyl group, or a substituted or unsubstituted C$_2$-C$_{30}$ heteroaryl group.

12. The lithium secondary battery as claimed in claim 11, wherein:
the cathode active material includes a lithium transition metal oxide containing nickel and at least one transition metal, and
the content of the nickel is 80 mol % or more, based on a total mole number of the transition metal.

13. The lithium secondary battery as claimed in claim 12, wherein the lithium transition metal oxide is represented by Formula 16:

<Formula 16>

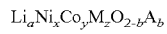

wherein, in Formula 16, 1.0≤a≤1.2, 0≤b≤0.2, 0.6≤x<1, 0<y≤0.3, 0<z≤0.3, and x+y+z=1 are satisfied; M is manganese (Mn), vanadium (V), magnesium (Mg), gallium (Ga), silicon (Si), tungsten (W), molybdenum (Mo), iron (Fe), chromium (Cr), copper (Cu), zinc (Zn), titanium (Ti), aluminum (Al), or boron (B); and A is F, S, Cl, Br, or a combination thereof.

14. The lithium secondary battery as claimed in claim 12, wherein the lithium transition metal oxide is represented by Formula 17 or 18:

<Formula 17>

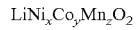

wherein, in Formula 17, 0.6≤x≤0.95, 0<y≤0.3, 0<z≤0.3, and x+y+z=1 are satisfied, <Formula 18>

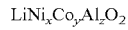

wherein, in Formula 18, 0.6≤x≤0.95, 0<y≤0.3, 0<z≤0.3, and x+y+z=1 are satisfied.

15. The lithium secondary battery as claimed in claim 11, wherein the anode active material includes a silicon compound, a carbon compound, or a composite of the silicon compound and the carbon compound.

* * * * *